United States Patent
Gates et al.

(10) Patent No.: US 9,800,590 B1
(45) Date of Patent: Oct. 24, 2017

(54) SYSTEMS AND METHODS FOR THREAT DETECTION USING A SOFTWARE PROGRAM UPDATE PROFILE

(71) Applicant: Symantec Corporation, Mountain View, CA (US)

(72) Inventors: Christopher Gates, Culver City, CA (US); Kevin Roundy, El Segundo, CA (US); Sandeep Bhatkar, Sunnyvale, CA (US); Anand Kashyap, Los Altos (CA); Yin Liu, Sunnyvale, CA (US); Aleatha Parker-Wood, Palo Alto, CA (US); Leylya Yumer, Antibes (FR)

(73) Assignee: Symantec Corporation, Mountain View, CA (US)

( * ) Notice: Subject to any disclaimer, the term of this patent is extended or adjusted under 35 U.S.C. 154(b) by 119 days.

(21) Appl. No.: 14/749,683

(22) Filed: Jun. 25, 2015

(51) Int. Cl.
*G06F 21/56* (2013.01)
*G06F 9/45* (2006.01)
*H04L 29/06* (2006.01)
*H04L 29/08* (2006.01)
*G06F 9/445* (2006.01)

(52) U.S. Cl.
CPC ........ *H04L 63/1408* (2013.01); *G06F 21/566* (2013.01); *H04L 67/30* (2013.01); *G06F 8/65* (2013.01)

(58) Field of Classification Search
CPC ....... H04L 63/14; G06F 21/56; G06F 21/561; G06F 21/566
See application file for complete search history.

(56) References Cited

U.S. PATENT DOCUMENTS

| 7,810,091 | B2 * | 10/2010 | Gartside | G06F 8/61 709/203 |
|---|---|---|---|---|
| 2005/0210459 | A1 * | 9/2005 | Henderson | G06F 8/65 717/168 |
| 2012/0254850 | A1 * | 10/2012 | Hido | G06F 8/65 717/168 |
| 2013/0174137 | A1 * | 7/2013 | Kim | G06F 8/65 717/171 |
| 2014/0181897 | A1 * | 6/2014 | Zaitsev | G06F 21/566 726/1 |

(Continued)

*Primary Examiner* — Kang Do
(74) *Attorney, Agent, or Firm* — FisherBroyles, LLP

(57) ABSTRACT

The disclosed computer-implemented method for threat detection using a software program update profile may include (1) building an update behavioral model that identifies legitimate update behavior for a software application by (a) monitoring client devices for update events associated with the software application and (b) analyzing the update events to identify the legitimate update behavior of the software application, (2) using the update behavioral model to identify suspicious behavior on a computing system by (a) detecting an update instance on the computing system, (b) comparing the update instance with the legitimate update behavior identified in the update behavioral model, and (c) determining, based on the comparison of the update instance with the legitimate update behavior, that the update instance is suspicious, and (3) in response to determining that the update instance is suspicious, performing a security action. Various other methods, systems, and computer-readable media are also disclosed.

18 Claims, 6 Drawing Sheets

(56) References Cited

U.S. PATENT DOCUMENTS

| | | | |
|---|---|---|---|
| 2015/0161024 A1* | 6/2015 | Gupta | G06F 11/3612 |
| | | | 714/47.3 |
| 2016/0042179 A1* | 2/2016 | Weingarten | G06F 21/566 |
| | | | 726/23 |
| 2016/0078362 A1* | 3/2016 | Christodorescu | G06N 99/005 |
| | | | 706/12 |
| 2016/0232353 A1* | 8/2016 | Gupta | G06F 21/566 |
| 2016/0285897 A1* | 9/2016 | Gantman | G06N 99/005 |
| 2016/0379136 A1* | 12/2016 | Chen | G06F 21/552 |
| | | | 706/12 |

\* cited by examiner

SYSTEMS AND METHODS FOR THREAT DETECTION USING A SOFTWARE PROGRAM UPDATE PROFILE

BACKGROUND

A new executable file being created on a system represents a potentially critical moment for the security of the system. The executable file may be a new software program being installed, an existing application being updated, or a form of malware. Attempts have been made to restrict the ability of users and processes to create new executable files by requiring administrator privileges to do so, but these attempts so significantly limit the flexibility and usability of computing systems that they may be viewed as annoyances to be bypassed.

Instead of trying to restrict the ability to create new executable files, computing security organizations have focused on identifying the provenance and analyzing the contents of the files. Security mechanisms such as code signing certificates and reputation systems have been used to attest to the trustworthiness of executable code files. A variety of malware protection systems analyze the contents of executable files as they are created to assure that the files are benign.

Despite these measures, malware often manages to infect computing systems, sometimes even by commandeering software distribution systems that distribute software programs and updates. Accordingly, the instant disclosure identifies and addresses a need for additional and improved systems and methods for threat detection associated with software updates.

SUMMARY

As will be described in greater detail below, the instant disclosure describes various systems and methods for threat detection using a software program update profile by monitoring client devices to identify update events and analyzing those events to create an update behavioral model. The systems and methods described herein may then use the update behavioral model to identify suspicious software program update behavior by detecting an instance of a software program update and comparing update events in the detected update instance to the legitimate update behavior of the update behavioral model. When the systems and methods described herein identify behavioral anomalies, these systems and methods may initiate appropriate security measures.

In one example, a computer-implemented method for threat detection using a software program update profile may include (1) building an update behavioral model that identifies legitimate update behavior for a software application by (a) monitoring at least one client device for update events associated with the software application and (b) analyzing the update events to identify the legitimate update behavior of the software application, (2) using the update behavioral model to identify suspicious behavior on a computing system by (a) detecting an update instance on the computing system, (b) comparing the update instance with the legitimate update behavior identified in the update behavioral model, and (c) determining, based on the comparison of the update instance with the legitimate update behavior, that the update instance is suspicious, and (3) in response to determining that the update instance is suspicious, performing a security action.

In some examples, monitoring the client device for the update events associated with the software application may include: (1) monitoring at least one process to detect update events initiated by the process, (2) detecting that the update event modified at least one executable file, (3) determining that the executable file is associated with the software application, and (4) determining, based on the executable file being associated with the software application, that the update event is associated with the software application.

In some examples, analyzing the update events to identify the legitimate update behavior of the software application may include (1) identifying an update creator, (2) identifying an update distributor, (3) identifying a file system location of one or more files modified by the update, (4) identifying a process hierarchy for one or more update processes, (5) calculating a digital fingerprint identifying the update, (6) compiling a history of network communications of one or more update processes, (7) identifying an operating system version of the client device, (8) identifying a language configuration of the client device, and/or (9) identifying a locality configuration of the client device.

In some examples, analyzing the update events to identify the legitimate update behavior of the software application may further include aggregating update event data from several client devices and analyzing the aggregated update event data to identify variations in update events within the update behavioral model. In some examples, the computer-implemented method may further include analyzing the aggregated update event data to identify (1) common features of update behavioral models related to several version updates to the software application, (2) a timing pattern of the version updates to the software application, and/or (3) common features of update behavioral models related to several software applications from a single software developer.

In some examples, determining that the update instance is suspicious may include determining that the update instance differs from the legitimate update behavior identified in the update behavioral model by at least a threshold. In some examples, determining that the update instance differs from the legitimate update behavior identified in the update behavioral model by at least a threshold may include (1) identifying at least one process associated with the update instance that is not associated with the update behavioral model, (2) identifying file activity associated with the update instance that is not associated with the update behavioral model, and/or (3) identifying registry modification activity associated with the update instance that is not associated with the update behavioral model.

In one embodiment, the update events may include (1) receiving a signal to initiate an update of the software application, (2) communicating with an update service, (3) receiving a file from a network device, (4) modifying a file, (5) creating a file, (6) moving a file, (7) renaming a file, (8) overwriting a portion of a file, and/or (9) modifying a registry entry. In the embodiment where the update event includes receiving the signal to initiate the update of the software application, the signal to initiate the update of the software application may include (1) a user action initiating the software application update, (2) a process connecting to a network device to determine that the software application update is available, and/or (3) a message from an update service indicating that the software application update is available.

In one embodiment, a system for implementing the above-described method may include several modules stored in memory, such as (1) a modeling module that builds an update behavioral model that identifies legitimate update behavior for a software application by (a) monitoring one or more client devices for one or more update events associated with the software application and (b) analyzing the update events to identify the legitimate update behavior of the software application, (2) an application module that uses the update behavioral model to identify suspicious behavior on a computing system by (a) detecting an update instance on the computing system, (b) comparing the update instance with the legitimate update behavior identified in the update behavioral model, and (c) determining, based on the comparison of the update instance with the legitimate update behavior, that the update instance is suspicious, and (3) a security module that, in response to determining that the update instance is suspicious, performs a security action. The system may also include at least one physical processor configured to execute the modeling module, the application module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) build an update behavioral model that identifies legitimate update behavior for a software application by (a) monitoring one or more client devices for one or more update events associated with the software application and (b) analyzing the update events to identify the legitimate update behavior of the software application, (2) use the update behavioral model to identify suspicious behavior on a computing system by (a) detecting an update instance on the computing system, (b) comparing the update instance with the legitimate update behavior identified in the update behavioral model, and (c) determining, based on the comparison of the update instance with the legitimate update behavior, that the update instance is suspicious, and (3) in response to determining that the update instance is suspicious, perform a security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
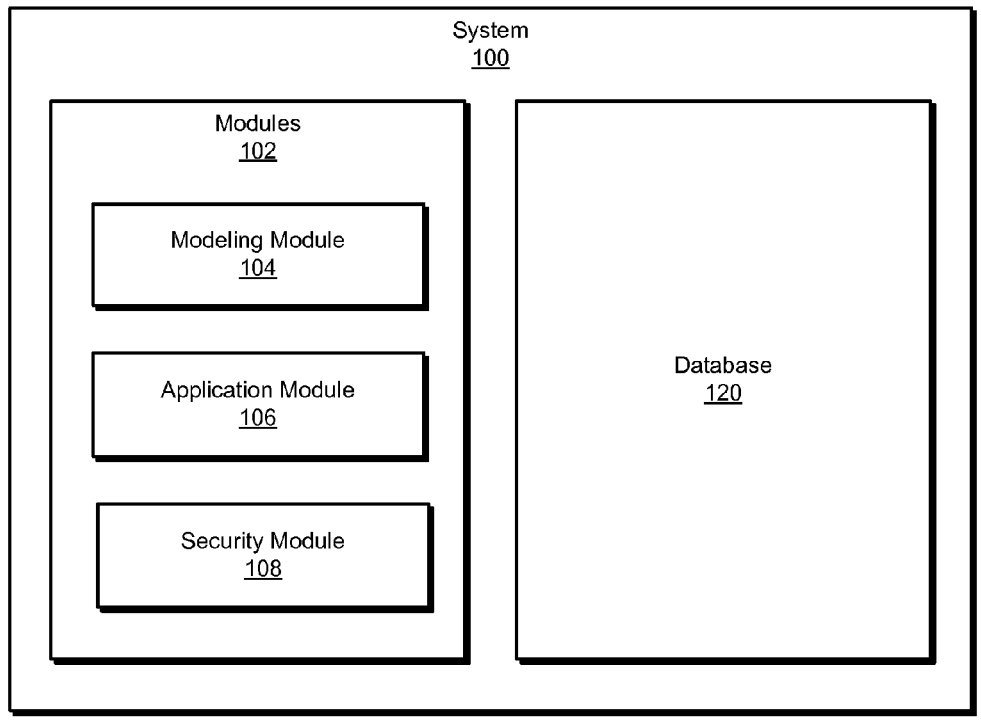
FIG. 1 is a block diagram of an exemplary system for threat detection using a software program update profile.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for threat detection using a software program update profile. As will be explained in greater detail below, by building an update behavioral model, the systems and methods described herein may detect likely security threats by comparing the behavior of software program updates to the legitimate update behavior identified when creating the update behavioral model and identifying anomalous update events. Systems and methods described herein may aggregate update event data collected from many computing devices to build a comprehensive update behavioral model that identifies such patterns as various update events associated with software versions or software program update schedules associated with particular software applications or software developers.

Figure 2:
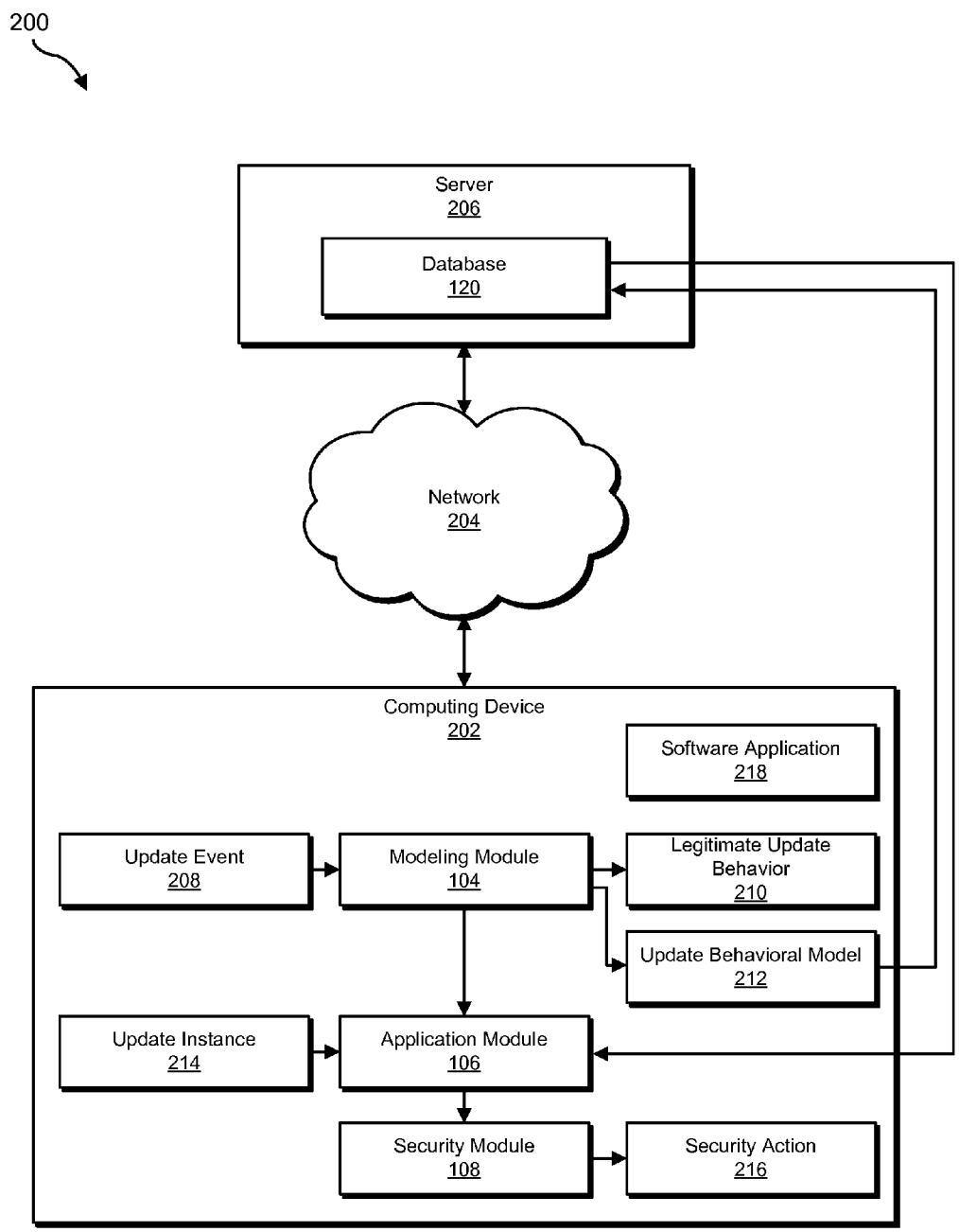
FIG. 2 is a block diagram of an additional exemplary system for threat detection using a software program update profile.
Figure 3:
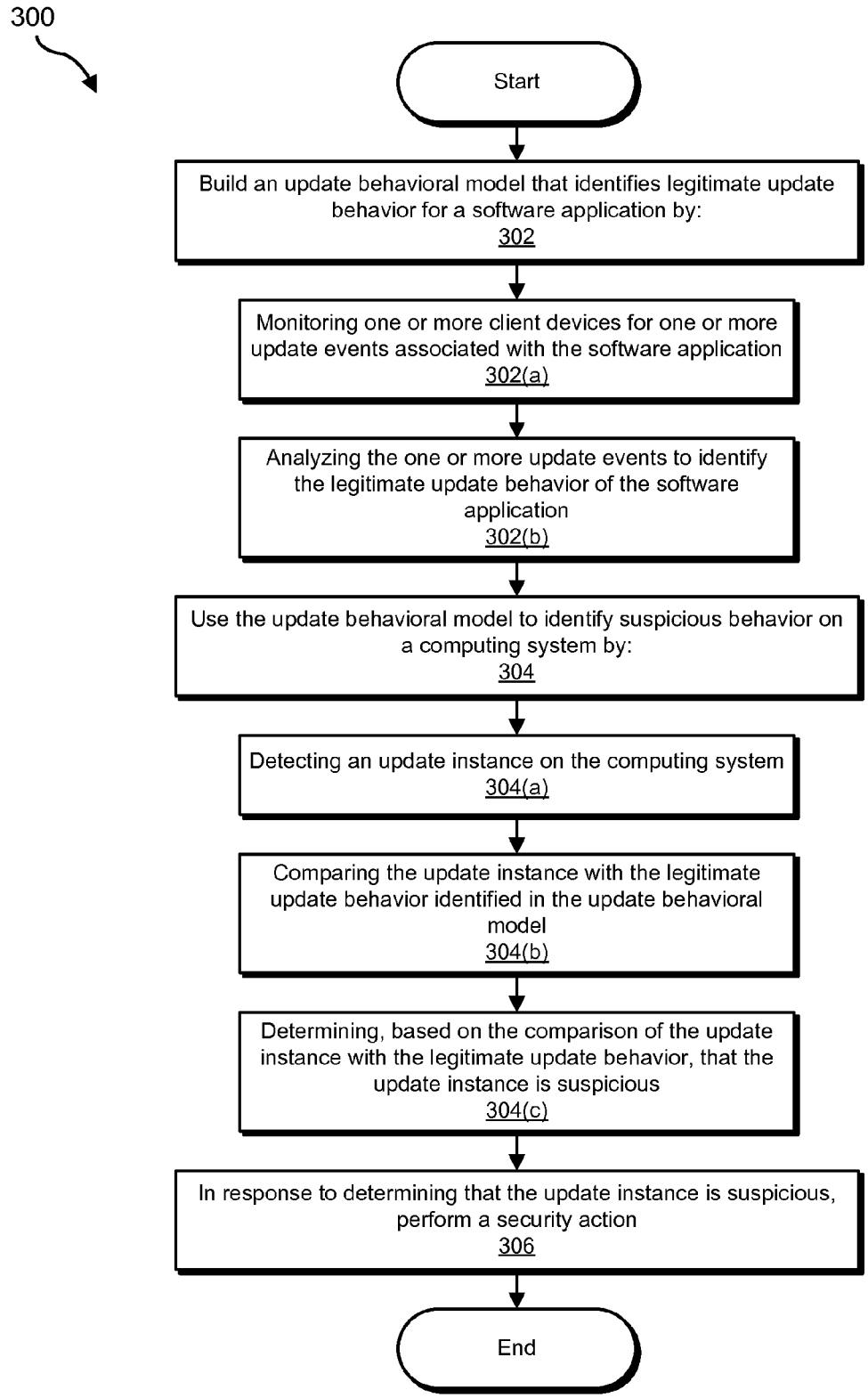
FIG. 3 is a flow diagram of an exemplary method for threat detection using a software program update profile.
Figure 4:
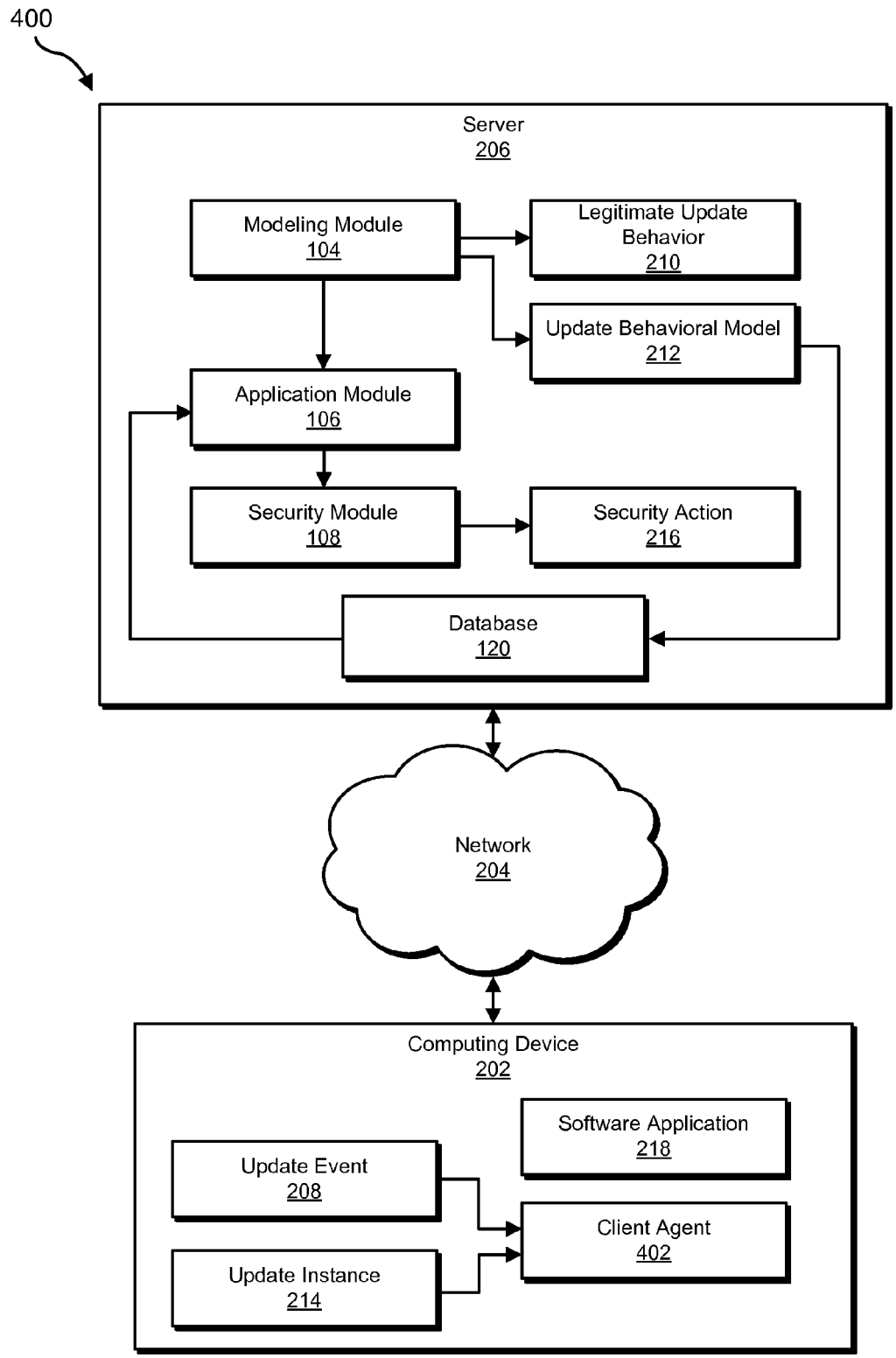
FIG. 4 is a block diagram of an exemplary server-based computing system for threat detection using a software program update profile.

The following will provide, with reference to FIGS. 1, 2, and 4, detailed descriptions of exemplary systems for threat detection using a software program update profile. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for threat detection using a software program update profile. As illustrated in this figure, exemplary system 100 may include one or more modules 102 for performing one or more tasks. For example, and as will be explained in greater detail below, exemplary system 100 may also include a modeling module 104 that may build an update behavioral model that identifies legitimate update behavior for a software application by monitoring one or more client devices for one or more update events associated with the software application and analyzing the update events to identify the legitimate update behavior of the software application. Exemplary system 100 may additionally include an application module 106 that may use the update behavioral model to identify suspicious behavior on a computing system by detecting an update instance on the computing system, comparing the update instance with the legitimate update behavior identified in the update behavioral model, and determining, based on the comparison of the update instance with the legitimate update behavior, that the update instance may be suspicious. Exemplary system 100 may also include a security module 108 that, in response to determining that the update instance is suspicious, performs a security action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing device 202 and/or server 206 in FIG. 4, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store update event data, update behavioral models, and/or software application data. Database 120 may represent portions of a single database or computing device or a plurality of databases or computing devices. For example, database 120 may represent a portion of server 206 in FIG. 2 or FIG. 4, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2 or FIG. 4, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect security threats using a software update profile. For example, and as will be described in greater detail below, one or more of modules 102 may cause computing device 202 and/or server 206 to detect security threats using a software program update profile. For example, modeling module 104 may monitor computing device 202 for one or more update events 208 and analyze the update events 208 to identify legitimate update behavior 210 and build an update behavioral model 212 for the software application. Application module 106 may use update behavioral model 212 to identify suspicious behavior on a computing system by detecting an update instance 214 on computing device 202, comparing update instance 214 with legitimate update behavior 210 identified in update behavioral model 212, and determining, based on the comparison of update instance 214 with legitimate update behavior 210, that update instance 214 is suspicious. Security module 108 may, in response to determining that update instance 214 is suspicious, perform a security action 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of receiving, comparing, and storing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for threat detection using a software program update profile. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, computing system 510 in FIG. 5, and/or portions of exemplary network architecture 600 in FIG. 6.

As illustrated in FIG. 3, at step 302, one or more of the systems described herein may build an update behavioral model that identifies legitimate update behavior for a software application. For example, modeling module 104 may, as part of computing device 202 in FIG. 2, build update behavioral model 212 that identifies legitimate update behavior 210 for software application 218.

The term "update behavior," as used herein, generally refers to a set of update events associated with a procedure to update a particular software application. The set of update events may be specific to a version of an application, an operating system or operating system version, a hardware configuration, and/or system configurations, such as an installed language or locale configuration. The term "update events," as used herein, generally refers to individual operations associated with a software application update, such as creating or modifying executable files or configuration files or receiving one or more files from an update service or network server.

Update events may take a variety of forms. In one embodiment, the update events may include (1) receiving a signal to initiate an update of the software application, (2) communicating with an update service, (3) receiving a file from a network device, (4) modifying a file, (5) creating a file, (6) moving a file, (7) renaming a file, (8) overwriting a portion of a file, and/or (9) modifying a registry entry.

Software application updates may be initiated in a variety of ways. For example, a signal to initiate the update of a software application may include a user action to initiate the software application update. A user may initiate an update by selecting menu item within the application or by clicking on a notification from a background process indicating that an update is available. In another example, a signal to initiate the update of a software application may include a process connecting to a network device to determine that the software application update is available. The application may initiate the update, or a process external to the application may begin an update process automatically or after receiving permission from a user. In another example, a signal to initiate the update of a software application may include a message from an update service indicating that the software application update is available. Software update services may be open to all users of a software application or an organization may operate its own software update service for the benefit of the organization's users.

Modeling module 104 may build an update behavioral model in a variety of ways. In one example, modeling module 104 may monitor a computing system in a controlled environment to assure that any update events detected are associated with an update of a specific application. In another example, modeling module 104 may aggregate update event information from many client devices with various hardware and operating system configurations. As will be described in greater detail below, building an update behavioral model may involve analyzing the update event information to determine such information as which software application is the object of the update, which detected events are included in the update, and/or what aspects of the update may vary, depending on the computing system configuration on which the update takes place.

At step 302(a), one or more of the systems described herein may monitor one or more client devices for one or more update events associated with the software application. For example, modeling module 104 may, as part of computing device 202 in FIG. 2, monitor one or more computing devices 202 for one or more update events 208 associated with software application 218.

Modeling module 104 may monitor client devices for update events in a variety of ways. For example, modeling module 104 may monitor user interface events to detect a user initiating a software update. In another example, modeling module 104 may monitor network communications to detect communications from an update service to initiate a software update or perform a software update in response to a signal from a user or process initiating the update. Modeling module 104 may also monitor file system operations to detect file creation or modification events associated with a software update. In another example, modeling module 104 may use an operating system's application programming interface (API) or event notification system to monitor changes to system registry entries related to a software update.

In one embodiment, modeling module 104 may detect update events to determine which application is the object of a software update. In some examples, modeling module 104 may monitor the client device for the update events associated with the software application by (1) monitoring one or more processes to detect update events initiated by the process, (2) detecting that the update events modified one or more executable files, (3) determining that the executable file is associated with the software application, and (4) determining, based on the executable file being associated with the software application, that the update event is associated with the software application. For example, modeling module 104 may monitor a process identified as related to updating a software application to detect when the process creates or modifies a file. When modeling module 104 detects the process modifying a file, modeling module 104 may identify the software application with which the file is associated and thereby determine that the process is updating the identified software application.

At step 302(b), one or more of the systems described herein may analyze the one or more update events to identify the legitimate update behavior of the software application. For example, modeling module 104 may, as part of computing device 202 in FIG. 2, analyze one or more update events 208 to identify legitimate update behavior 210 of software application 218. As will be described in greater detail below, once legitimate update behavior has been identified and incorporated into an update behavioral model, systems and methods described herein may identify suspicious update instances by detecting anomalous update events that differ from legitimate update behavior.

Modeling module 104 may analyze update events to identify legitimate update behavior in a variety of ways. In some examples, modeling module 104 may analyze one or more files associated with a software update to obtain information characterizing the files that may be later used to identify a software update or to detect anomalies in a software update. In one example, modeling module 104 may analyze the update events to identify legitimate update behavior by identifying an update creator or distributor. For example, modeling module 104 may examine a code signing certificate of an update executable file or search a file for text strings identifying the developer of a software application update. In another example, modeling module 104 may analyze update events by calculating a digital fingerprint identifying an update file. The digital fingerprint may be compared to a database of digital fingerprints to identify a software update or to detect that a software update has been modified.

In some examples, modeling module 104 may analyze update events to identify legitimate update behavior by analyzing the context of the events. For example, modeling module 104 may identify a file system location of one or more files modified by the update. An update behavioral model may characterize legitimate update behavior of a software update by identifying executable or configuration files modified by the update. In another example, modeling module 104 may identify a process hierarchy for one or more update processes. For example, a software update may be identified by the parent process that initiated the update process or by child processes initiated by the update process. Modeling module 104 may also analyze the update events by compiling a history of network communications of one or more update processes. For example, some applications have a background process that periodically polls a network server to determine whether a software update is available.

In some examples, modeling module 104 may analyze the update events to identify the legitimate update behavior of the software application by identifying an operating system version, language configuration, and/or locality configuration of the client device associated with the software update. An update behavioral model may characterize a software update as being specific to a particular operating system version or system configuration. An update behavioral model may include differences in update behavior, depending on the configuration of the computing device on which the software update executes.

In some examples, modeling module 104 may analyze the update events to identify the legitimate update behavior of the software application by aggregating update event data from several client devices and analyzing the aggregated update event data to identify variations in update events within the update behavioral model. For example, a software update identified by a digital fingerprint as being the same executable file may exhibit different update behavior on different client devices, depending on the version of the software application being updated or system configuration characteristics of the client devices.

In some examples, modeling module 104 may analyze update event data aggregated from several client devices to identify common features of several update behavioral models related to different version updates to the software application. In this way, modeling module 104 may create a comprehensive update behavioral model for a software application with separate behavioral models for different versions of the application. The group of related behavioral models may later facilitate distinguishing variations in update behavior related to software version differences from anomalous and potentially suspicious update behavior.

In another example, modeling module 104 may analyze aggregated update event data to identify a timing pattern of the version updates to the software application. For example, an application developer may release application updates on a regular schedule, and version updates may be applied in the sequence in which they are released. An update behavioral model may indicate that a version update that occurs outside the release schedule or not in sequence may be considered anomalous and potentially suspicious. In another example, modeling module 104 may analyze aggregated update event data to identify common features of update behavioral models related to several software applications from a single software developer. An application developer may use a common framework for developing software updates for several applications and/or a common infrastructure for distributing updates for several applications. Modeling module 104 may develop a comprehensive update behavioral model that identifies legitimate update behavior in common for several software applications from a particular developer.

At step 304, one or more of the systems described herein may use the update behavioral model to identify suspicious behavior on a computing system. For example, application module 106 may, as part of computing device 202 in FIG. 2, use update behavioral model 212 to identify suspicious behavior on computing device 202. Application module 106 may identify suspicious behavior related to update instance 214 in a variety of ways. As will be described in greater detail below, application module 106 may compare update events included in update instance 214 to identify similarities and differences between update instance 214 and legitimate update behavior 210 identified in update behavioral model 212.

At step 304(a), one or more of the systems described herein may detect an update instance on the computing system. For example, application module 106 may, as part of computing device 202 in FIG. 2, detect update instance 214 on computing device 202. Application module 106 may detect update instance 214 in a variety of ways. For example, application module 106 may use many of the same mechanisms that modeling module 104 used to identify update events 208. Application module 106 may monitor user actions, executing processes, and/or network communications to detect that a software update has been initiated. Application module 106 may also monitor file system events to detect file creation or operating system events to detect modifications to one or more registry entries.

At step 304(b), one or more of the systems described herein may compare the update instance with the legitimate update behavior identified in the update behavioral model. For example, application module 106 may, as part of computing device 202 in FIG. 2, compare update instance 214 with legitimate update behavior 210 identified in update behavioral model 212.

Application module 106 may compare the update instance with legitimate update behavior in an update behavioral model in a variety of ways. For example, application module 106 may compare files created or modified by the update instance with files created or modified by legitimate update behavior to determine whether the files are in a same or similar location relative to where the application is installed and whether the file contents are the same. Application module 106 may calculate a digital fingerprint of an update file associated with the update instance and compare it to a digital fingerprint of an update file included in the update behavioral model. In another example, application module 106 may analyze the process hierarchy of the update instance and compare it with legitimate update behavior in the update behavioral model to determine whether the update process was initiated by the same parent process and/or whether the update process initiated the same child processes. Application module 106 may similarly compare network communications, registry modifications, and/or the origin of the signal that initiated the update instance with legitimate update behavior in the update behavioral model. In some examples, application module 106 may compare timing of the update instance to determine whether the update instance follows an update schedule identified in the update behavioral model.

At step 304(c), one or more of the systems described herein may determine, based on the comparison of the update instance with the legitimate update behavior, that the update instance is suspicious. For example, application module 106 may, as part of computing device 202 in FIG. 2, determine, based on the comparison of update instance 214 with legitimate update behavior 210 of update behavioral model 212, that update instance 214 is suspicious. Application module 106 may determine that update instance 214 is suspicious in a variety of ways. In one example, application module 106 may identify aspects of the comparison that clearly indicate that the update instance is suspicious. For example, the update instance may modify files, registry entries, or operating system settings not identified in the update behavioral model.

In some examples, application module 106 may determine that the update instance is suspicious by determining that the update instance differs from the legitimate update behavior identified in the update behavioral model by at least a threshold. For example, application module 106 may determine that a combination of an anomalous process hierarchy and differences in the location of files modified by the update instance indicate that the update instance is suspicious, even though either of those components alone would not justify a level of suspicion above a threshold. In one example, application module 106 may utilize a scoring system to calculate a numerical trustworthiness score and compare the score to a numerical threshold value.

In some examples, application module 106 may determine that the update instance differs from the legitimate update behavior identified in the update behavioral model by at least a threshold by (1) identifying at least one process associated with the update instance that is not associated with the update behavioral model, (2) identifying file activity associated with the update instance that is not associated with the update behavioral model, and/or (3) identifying registry modification activity associated with the update instance that is not associated with the update behavioral model. Application module 106 may also determine that certain categories or combinations of categories of differences between the update instance and legitimate update behavior indicate that the update instance merits a level of suspicion about a threshold.

In another example, application module 106 may determine that the update instance differs from the legitimate update behavior identified in the update behavioral model by determining that the update instance is applying an update to a software application out of the sequence identified by modeling module 104 when analyzing aggregated update data from several client devices. Application module 106 may also determine that the update instance occurs outside a timing pattern identified by modeling module 104 from the aggregated update event data. For example, application module 106 may determine that a software version update has taken place before the expected release of a version update for the software application.

At step 306, one or more of the systems described herein may, in response to determining that the update instance is suspicious, perform a security action. For example, security module 108 may, in response to determining that update instance 214 is suspicious, perform security action 216. Security module 108 may perform a variety of security actions. For example, security module 108 may notify a user or administrator of the suspicious update, block execution of the update, execute a more intensive analysis of the update, and/or move the update to a controlled environment for further testing and analysis.

In addition to the client-based system shown in FIG. 2, the exemplary computer-implemented method 300 for threat detection using a software program update profile shown in FIG. 3 may also be executed by a server-based system. FIG. 4 is a block diagram of an exemplary server-based computing system 400 for threat detection using a software program update profile. Computing system 400 may include components of computing system 200 in FIG. 2, such as computing device 202, network 204, server 206, and database 120 that resides on server 206. One or more of modules 102 may be located on server 206, such as modeling module 104, application module 106, and security module 108. The modules 102 may be represented on the client computing device 202 by a client agent 402. Client agent 402 may detect one or more update events 208 related to software application 218 and transmit data related to the update events 208 to modeling module 104, which analyzes the update event data to identify legitimate update behavior 210 and develop update behavioral model 212. Client agent 402 may subsequently identify update instance 214 and transmit data related to update instance 214 to application module 106. If application module 106 determines that update behavior of update instance 214 is suspicious, security module 216 may initiate a security action 216, which may be carried out, at least in part, by client agent 402.

As described above, systems and methods described herein may develop a software program update profile by monitoring a client device to detect update events and analyze the events to identify legitimate update behavior and develop an update behavioral model for an application update. Systems and methods described herein may use the behavioral update model to evaluate a subsequent update instance to determine whether the update instance includes significant differences from the identified legitimate update behavior, indicating that the update may represent a potential threat. By aggregating update behavior from several client devices, systems and methods described herein may develop comprehensive update behavioral models that account for common update events in different versions of a software application or updates to different applications from a single application developer.

Figure 5:
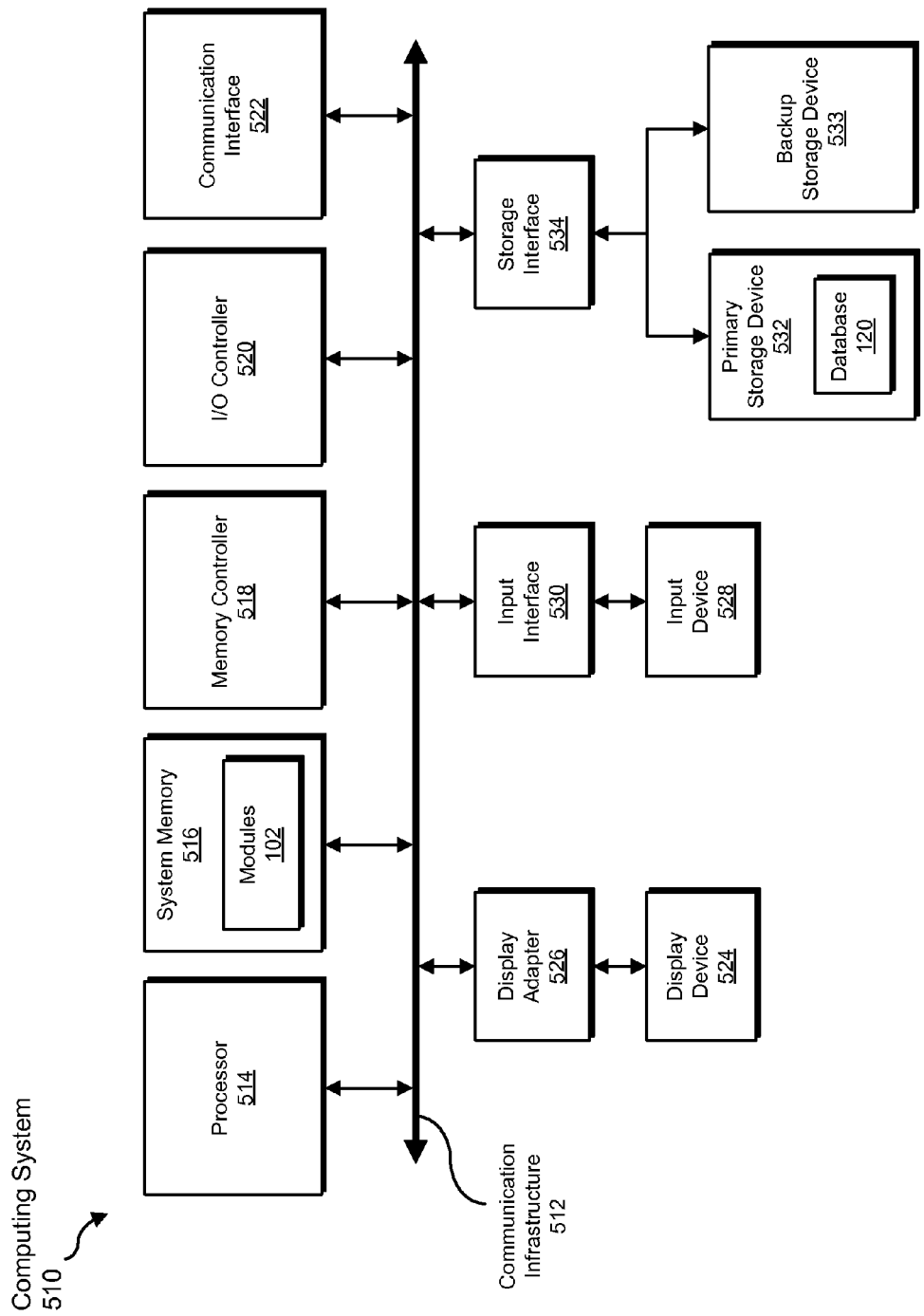
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
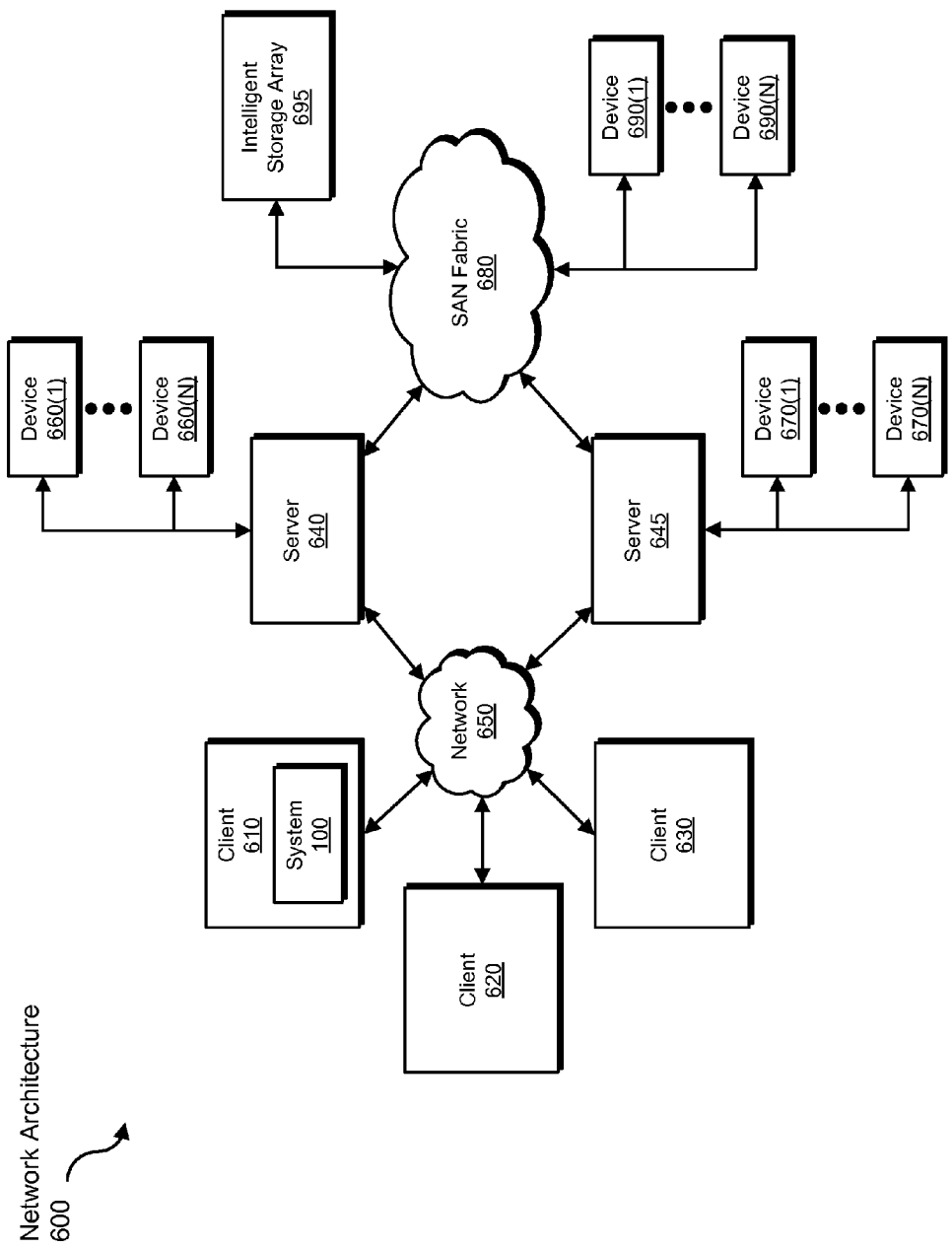
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for threat detection using a software program update profile.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive update event data to be transformed, transform the update event data, output a result of the transformation to build an update behavioral model, use the result of the transformation to compare update behavior associated with an update instance with legitimate update behavior, and store the result of the transformation to provide the update behavioral model to client devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:
1. A computer-implemented method for threat detection using a software program update profile, at least a portion of the method being performed by a computing device comprising at least one processor, the method comprising:
building an update behavioral model that identifies legitimate update behavior for a software application by:

monitoring at least one client device for at least one update event associated with updating the software application prior to executing the updated software application by:
   monitoring at least one process to detect at least one update event initiated by the process;
   detecting that the update event initiated by the process modified at least one executable file;
   determining that the executable file is associated with the software application; and
   determining, based on the executable file being associated with the software application, that the update event initiated by the process is associated with the software application; and
analyzing the at least one update event initiated by the process to identify the legitimate update behavior for the software application;
using the update behavioral model to identify suspicious update behavior on a computing system by:
   detecting an instance of software application update on the computing system;
   comparing the instance of software application update with the legitimate update behavior identified in the update behavioral model; and
   determining, based on the comparison of the instance of software application update with the legitimate update behavior, that the instance of software application update is suspicious; and
in response to determining that the instance of software application update is suspicious, performing a security action that blocks execution of the instance of software application update.

2. The computer-implemented method of claim 1, wherein analyzing the at least one update event initiated by the process to identify the legitimate update behavior for the software application comprises at least one of:
- identifying an update creator;
- identifying an update distributor;
- identifying a file system location of at least one file modified by the update of the software application;
- identifying a process hierarchy for at least one update process;
- calculating a digital fingerprint identifying the update of the software application;
- compiling a history of network communications of at least one update process;
- identifying an operating system version of the client device;
- identifying a language configuration of the client device; and
- identifying a locality configuration of the client device.

3. The computer-implemented method of claim 1, wherein analyzing the at least one update event initiated by the process to identify the legitimate update behavior for the software application further comprises:
- aggregating update event data from a plurality of client devices; and
- analyzing the aggregated update event data to identify variations in update events within the update behavioral model.

4. The computer-implemented method of claim 3, further comprising analyzing the aggregated update event data to identify at least one of:
- common features of a plurality of update behavioral models related to a plurality of version updates to the software application;
- a timing pattern of the version updates to the software application; and
- common features of update behavioral models related to a plurality of software applications from a single software developer.

5. The computer-implemented method of claim 1, wherein determining that the instance of software application update is suspicious comprises determining that the instance of software application update differs from the legitimate update behavior identified in the update behavioral model by at least a threshold.

6. The computer-implemented method of claim 5, wherein determining that the instance of software application update differs from the legitimate update behavior identified in the update behavioral model by at least a threshold comprises at least one of:
- identifying at least one process associated with the instance of software application update that is not associated with the update behavioral model;
- identifying file activity associated with the instance of software application update that is not associated with the update behavioral model; and
- identifying registry modification activity associated with the instance of software application update that is not associated with the update behavioral model.

7. The computer-implemented method of claim 1, wherein the at least one update event initiated by the process comprises at least one of:
- receiving a signal to initiate an update of the software application;
- communicating with an update service;
- receiving a file from a network device;
- modifying a file;
- creating a file;
- moving a file;
- renaming a file;
- overwriting a portion of a file; and
- modifying a registry entry.

8. The computer-implemented method of claim 7, wherein:
- the at least one update event initiated by the process comprises receiving the signal to initiate the update of the software application; and
- the signal to initiate the update of the software application comprises at least one of:
  - a user action initiating the software application update;
  - a process connecting to a network device to determine that the software application update is available; and
  - a message from an update service indicating that the software application update is available.

9. The computer-implemented method of claim 1, wherein analyzing the at least one update event initiated by the process to identify the legitimate update behavior for the software application comprises analyzing at least one file associated with the at least one update event initiated by the process.

10. A system for threat detection using a software program update profile, the system comprising:
a modeling module, stored in memory, that builds an update behavioral model that identifies legitimate update behavior for a software application by:
   monitoring at least one client device for at least one update event associated with updating the software application prior to executing the updated software application by:
      monitoring at least one process to detect at least one update event initiated by the process;

detecting that the update event initiated by the process modified at least one executable file;
determining that the executable file is associated with the software application; and
determining, based on the executable file being associated with the software application, that the update event initiated by the process is associated with the software application; and
analyzing the at least one update event initiated by the process to identify the legitimate update behavior for the software application;
an application module, stored in memory, that uses the update behavioral model to identify suspicious update behavior on a computing system by:
detecting an instance of software application update on the computing system;
comparing the instance of software application update with the legitimate update behavior identified in the update behavioral model; and
determining, based on the comparison of the instance of software application update with the legitimate update behavior, that the instance of software application update is suspicious;
a security module that, in response to determining that the instance of software application update is suspicious, performs a security action that blocks execution of the instance of software application update; and
at least one physical processor configured to execute the modeling module, the application module, and the security module.

11. The system of claim 10, wherein the modeling module analyzes the at least one update event initiated by the process to identify the legitimate update behavior for the software application by at least one of:
identifying an update creator;
identifying an update distributor;
identifying a file system location of at least one file modified by the update of the software application;
identifying a process hierarchy for at least one update process;
calculating a digital fingerprint identifying the update of the software application;
compiling a history of network communications of at least one update process;
identifying an operating system version of the client device;
identifying a language configuration of the client device; and
identifying a locality configuration of the client device.

12. The system of claim 10, wherein the modeling module analyzes the at least one update event initiated by the process to identify the legitimate update behavior for the software application further by:
aggregating update event data from a plurality of client devices; and
analyzing the aggregated update event data to identify variations in update events within the update behavioral model.

13. The system of claim 12, wherein the modeling module analyzes the aggregated update event data to identify at least one of:
common features of a plurality of update behavioral models related to a plurality of version updates to the software application;
a timing pattern of the version updates to the software application; and
common features of update behavioral models related to a plurality of software applications from a single software developer.

14. The system of claim 10, wherein the application module determines that the instance of software application update is suspicious by determining that the instance of software application update differs from the legitimate update behavior identified in the update behavioral model by at least a threshold.

15. The system of claim 14, wherein the application module determines that the instance of software application update differs from the legitimate update behavior identified in the update behavioral model by at least a threshold by at least one of:
identifying at least one process associated with the instance of software application update that is not associated with the update behavioral model;
identifying file activity associated with the instance of software application update that is not associated with the update behavioral model; and
identifying registry modification activity associated with the instance of software application update that is not associated with the update behavioral model.

16. The system of claim 10, wherein the at least one update event initiated by the process comprises at least one of:
receiving a signal to initiate an update of the software application;
communicating with an update service;
receiving a file from a network device;
modifying a file;
creating a file;
moving a file;
renaming a file;
overwriting a portion of a file; and
modifying a registry entry.

17. The system of claim 16, wherein:
the at least one update event initiated by the process comprises receiving the signal to initiate the update of the software application; and
the signal to initiate the update of the software application comprises at least one of:
a user action initiating the software application update;
a process connecting to a network device to determine that the software application update is available; and
a message from an update service indicating that the software application update is available.

18. A non-transitory computer-readable medium comprising one or more computer-readable instructions that, when executed by at least one processor of a computing device, cause the computing device to:
build an update behavioral model that identifies legitimate update behavior for a software application by:
monitoring at least one client device for at least one update event associated with updating the software application prior to executing the updated software application by:
monitoring at least one process to detect at least one update event initiated by the process;
detecting that the update event initiated by the process modified at least one executable file;
determining that the executable file is associated with the software application; and
determining, based on the executable file being associated with the software application, that the update event initiated by the process is associated with the software application; and analyzing the at least one update event initiated by the process to identify the legitimate update behavior for the software application;
use the update behavioral model to identify suspicious update behavior on a computing system by:
 detecting an instance of software application update on the computing system;
 comparing the instance of software application update with the legitimate update behavior identified in the update behavioral model; and
 determining, based on the comparison of the instance of software application update with the legitimate update behavior, that the instance of software application update is suspicious; and
in response to determining that the instance of software application update is suspicious, perform a security action that blocks execution of the instance of software application update.

\* \* \* \* \*